United States Patent
Lin et al.

(10) Patent No.: US 7,533,996 B2
(45) Date of Patent: May 19, 2009

(54) CONTRAST ADJUSTABLE PROJECTOR APPARATUS

(75) Inventors: Shengwei Lin, Taoyuan County (TW); Kuotung Wu, Taoyuan County (TW)

(73) Assignee: Delta Electronics, Inc., Guei-Shan (TW)

( * ) Notice: Subject to any disclaimer, the term of this patent is extended or adjusted under 35 U.S.C. 154(b) by 474 days.

(21) Appl. No.: 11/313,458

(22) Filed: Dec. 21, 2005

(65) Prior Publication Data

US 2006/0290902 A1 Dec. 28, 2006

(30) Foreign Application Priority Data

Jun. 22, 2005 (TW) .............................. 94120859 A
Oct. 27, 2005 (TW) .............................. 94137702 A (51) Int. Cl.
*G03B 21/28* (2006.01)
*G03B 21/14* (2006.01)
*G03B 21/26* (2006.01)
*H04N 5/74* (2006.01)
*G02B 6/00* (2006.01)
*G09F 13/00* (2006.01)

(52) U.S. Cl. .............................. 353/99; 353/20; 353/84; 353/37; 348/771; 385/133; 362/551

(58) Field of Classification Search .................. 353/99, 353/20, 84, 37; 348/771; 385/133; 362/551
See application file for complete search history.

(56) References Cited

U.S. PATENT DOCUMENTS

| | | | |
|---|---|---|---|
| 5,917,558 A * | 6/1999 | Stanton | 348/743 |
| 6,583,940 B2 * | 6/2003 | Nishikawa et al. | 359/738 |
| 6,588,908 B2 * | 7/2003 | Shimizu | 353/81 |
| 6,773,120 B2 | 8/2004 | Colpaert | 353/122 |
| 2003/0123163 A1 * | 7/2003 | Penn | 359/833 |
| 2005/0036216 A1 * | 2/2005 | Lee | 359/738 |
| 2007/0058143 A1 * | 3/2007 | Penn et al. | 353/102 |

* cited by examiner

*Primary Examiner*—Diane I Lee
*Assistant Examiner*—Magda Cruz
(74) *Attorney, Agent, or Firm*—Grossman, Tucker, Perreault & Pfleger, PLLC (57) ABSTRACT

A contrast adjustable projector apparatus including a body, a light source, an illumination unit, a lens assembly and a regulation device is disclosed. The light source is disposed in the body for generating light beams. The illumination unit connects the light source and the lens assembly to guide the light beams to project onto the lens assembly. The illumination unit includes a digital micromirror device (DMD) which is controlled by a controller to rotate at a specific angle according to the transmitted signals, thereby projecting the light beams transmitting from the light source as an on-state light, a flat state light or an off-state light. The regulation device is provided at an outer side of the lens assembly to adjustably shield at least a part of flat state light which is incident to a light inlet, in order to the contrast of the light emitted out of the lens assembly.

19 Claims, 8 Drawing Sheets

CONTRAST ADJUSTABLE PROJECTOR APPARATUS

CROSS-REFERENCES TO RELATED APPLICATIONS

This application claims priority to Taiwan Patent Application No. 094120859 filed on Jun. 22, 2005 and Taiwan Patent Application No. 094137702 filed on Oct. 27, 2005.

BACKGROUND OF THE INVENTION

1. Field of the Invention

The present invention generally relates to a projector apparatus. More particularly, the present invention relates to a contrast adjustable projector apparatus having a nontelecentric architecture.

2. Description of Related Art

The projector has become a commonly used image device in the office, the meeting room or at home. The projector includes the liquid crystal on silicon (LCOS) projector and the digital light processing (DLP) projector. There are two types of the DLP projector, including the telecentric architecture and the nontelecentric architecture. Compared with the LCOS projector, the image performance of the DLP projector is better, therefore, the DLP projector has become the mainstream in the market.

Figure 1:
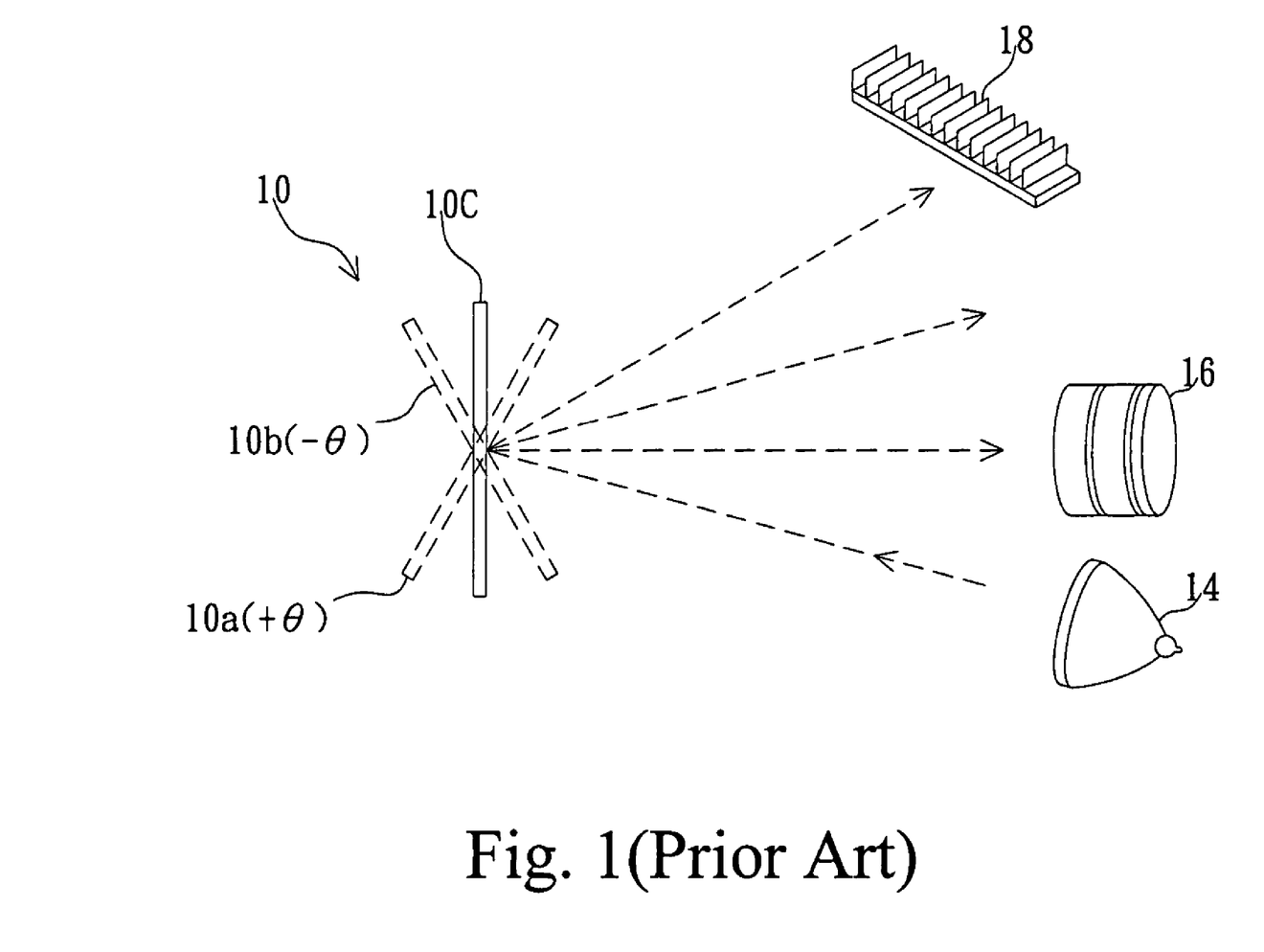
FIG. 1 is a schematic diagram showing the relationship between the rotation of the DMD and each optical element.

Because the DLP projector has a built-in digital micromirror device (DMD) which provides better image projection quality, therefore, the DLP projector has a superior performance. FIG. 1 is a schematic diagram showing the relationship between the rotation of the DMD (actually, the DMD is the digital micromirror unit 10) and each optical element. The projector mainly comprises a light source 14, a lens 16, a DMD 10 and an integrator 18. Each digital micromirror unit 10 is corresponding to each pixel of the projector 200. After the light source 14 emits a light, if the digital micromirror unit 10 receives an on-state signal, it would rotate to a tilt angle (+θ) as the digital micromirror unit 10a. Thus, the light travels through the lens 16 and the corresponding pixel performs an on-state. If the digital micromirror unit 10 receives an off-state signal, it would rotate to a tilt angle (−θ) as the digital micromirror unit 10b. At this time, the light is incident to the integrator 18 and the corresponding pixel performs an off-state. Generally speaking, θ is about 10 degree to 12 degree. However, if the digital micromirror unit 10 does not rotate or rotates to 0 degree, the corresponding pixel performs a flat state; Because the flat state is an unsteady state, therefore, the scattering light would be incident to the projector and the contrast of the whole screen would be lower.

The brightness of the projector is in conflict with the contrast substantially. It means that if the image brightness is higher, the contrast would be lower. On the contrary, if the image brightness is lower, the contrast would be higher. Because the conventional DLP projector can only provide constant contrast and brightness, therefore, the flexibility of the applications of the DLP projector is not sufficient. The capability and the value of the DLP projector are lower.

In U.S. Patent Publication No. 2005/0036216A1, an image display apparatus having a telecentric architecture is disclosed. A tunable illumination mask having an illumination hole is positioned at the location of an illumination stop. The tunable illumination mask comprises a plurality of movable diaphragms which overlap with one another to form the illumination hole. The size of the illumination hole is adjusted by adjusting the movable diagrams to effectively block light of noise-type. However, the requirements for setting the tunable illumination mask are very restricted, such as the position, the mechanical design, etc. Besides, the tunable illumination mask blocks light of noise-type in each area and light in an on-state would also be blocked, too. Although the contrast of the image display apparatus can be enhanced, the brightness is drastically decreased. The display quality is lower. In addition, it's harder to set up the tunable illumination mask in lenses and the requirement for precision is higher. Therefore, the cost of the lens and the whole image display apparatus is higher, and product is less competitive on the market.

In light of the above, the solution of how to enhance the contrast with the limited reduction of the brightness under the condition of simple fabrication process and lower cost is highly desired in the technology of the projector industry.

SUMMARY OF THE INVENTION

A main purpose of the present invention is to provide a projector apparatus having a nontelecentric architecture, to effectively adjust the contrast without drastically changing the brightness. In particular, the invention utilizes a regulation device provided near an optically simulated exit pupil disposed at an outer side of a lens assembly, to adjustably move into the exit pupil. Therefore, an overlap region formed between on-state light and flat state light is partially or completely shielded, to effectively enhance the image contrast with limited reduction of the brightness.

The second purpose of the present invention is to provide a projector apparatus having a nontelecentric architecture, to effectively adjust the contrast with limited reduction of the brightness. The regulation device is provided at an outer side of the lens assembly. Therefore, the design of the regulation device does not need to match the lens assembly and becomes simpler. Thus, the complexity of fabrication process and the cost are lower, and the projector apparatus of the present invention is more competitive on the market.

As embodied and broadly described herein, the present invention provides a contrast adjustable projector apparatus including a body, a light source, a lens assembly, an illumination unit and a regulation device is disclosed. The light source is disposed in the body for generating light beams. The lens assembly has a light inlet. The illumination unit disposed in the body and connects the light source and the lens assembly to guide the light beams to project onto the lens assembly. The illumination unit includes a controller. A digital micromirror device (DMD) controlled by the controller to rotate at a specific angle according to required signals, thereby projecting the light beams transmitted from the light source as an on-state light, a flat state light or an off-state light. The on-state light and a part of the flat state light are guided into the lens assembly through the light inlet. The projector apparatus further comprises a regulation device provided at an outer side of the lens assembly, to adjustably shield at least a part of the flat state light which is incident to the light inlet.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present embodiments of the invention, examples of which are illustrated in the accompanying drawings. Wherever possible, the same reference numbers are used in the drawings and the description to refer to the same or like parts.

Figure 2A:
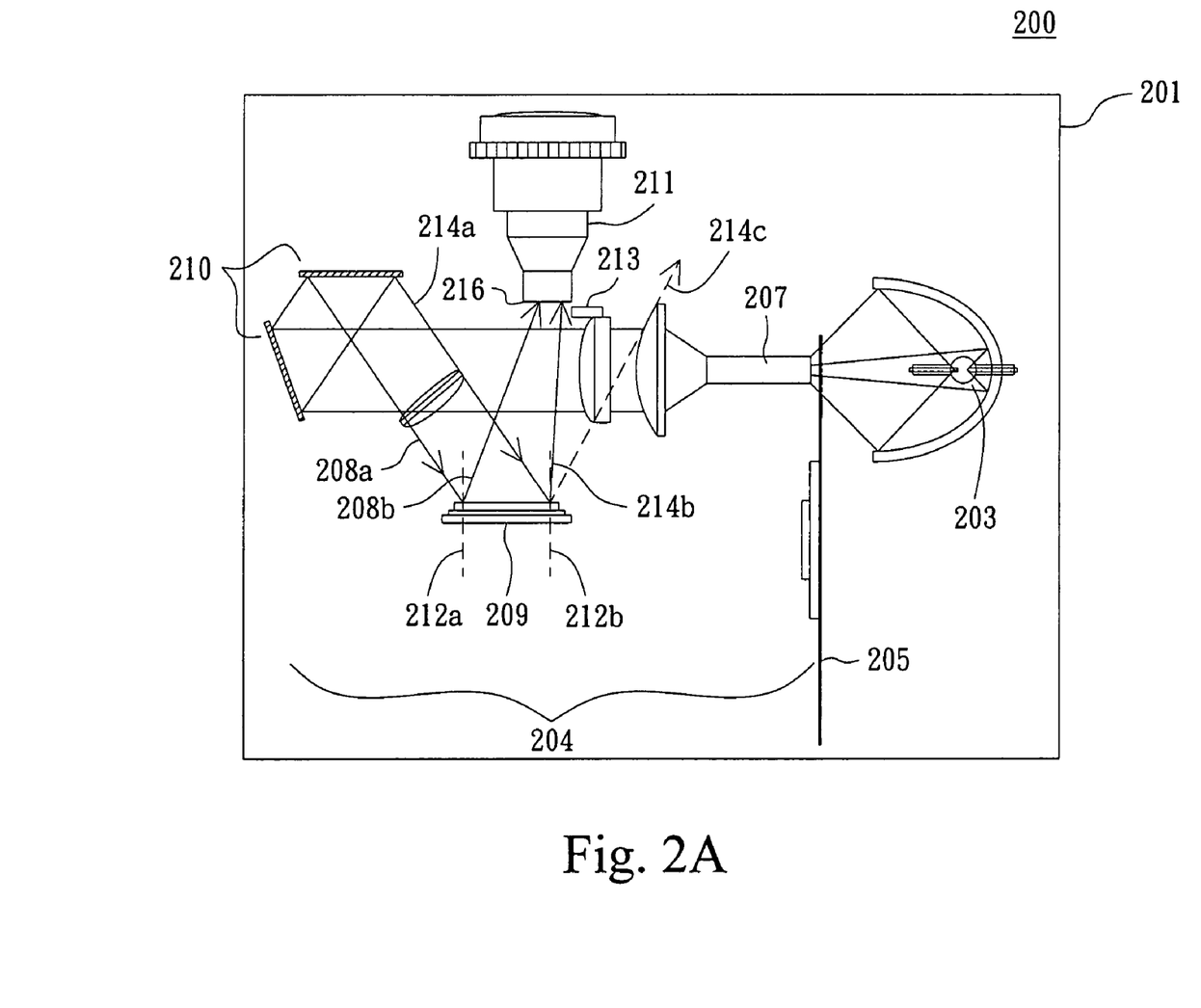
FIG. 2A is a schematic diagram showing a projector apparatus having a nontelecentric architecture of the present invention.

FIG. 2A is a schematic diagram showing the structure of a projector apparatus having a nontelecentric architecture of the present invention. The projector apparatus 200 comprises a body 201, a light source 203, an illumination unit 204, a regulation device 213 and a lens assembly 211. It is preferred that the illumination unit 204 comprises a color wheel 205, a reflector 210, an integrator rod 207 and a digital mirror device (DMD) 209.

The light source 203 is disposed in the body 201 for generating light beams. The lens assembly 211 has a light inlet 216. The illumination unit 204 is also disposed in the body 201 and connects the light source 203 and the lens assembly 211, to guide the light beams generated from the light source 203 to project onto the lens assembly 211. It is preferred that the light source 203 generates light of different colors (such as red light, green light and blue light) through the color wheel 205. The light passing through the color wheel 205 travels through the integrator rod 207 and becomes uniform light. Then, the uniform light is reflected to the DMD 209 by the reflector 210. Finally, the reflected light is guided into the lens assembly 211 by the DMD 209 and passes through the lens assembly 211 to project on a screen. If two lights 208a and 214a are incident to the DMD 209 through the reflector 210, and the lights are not parallel to the main axes 212a and 212b, this forms a nontelecentric architecture.

Figure 2B:
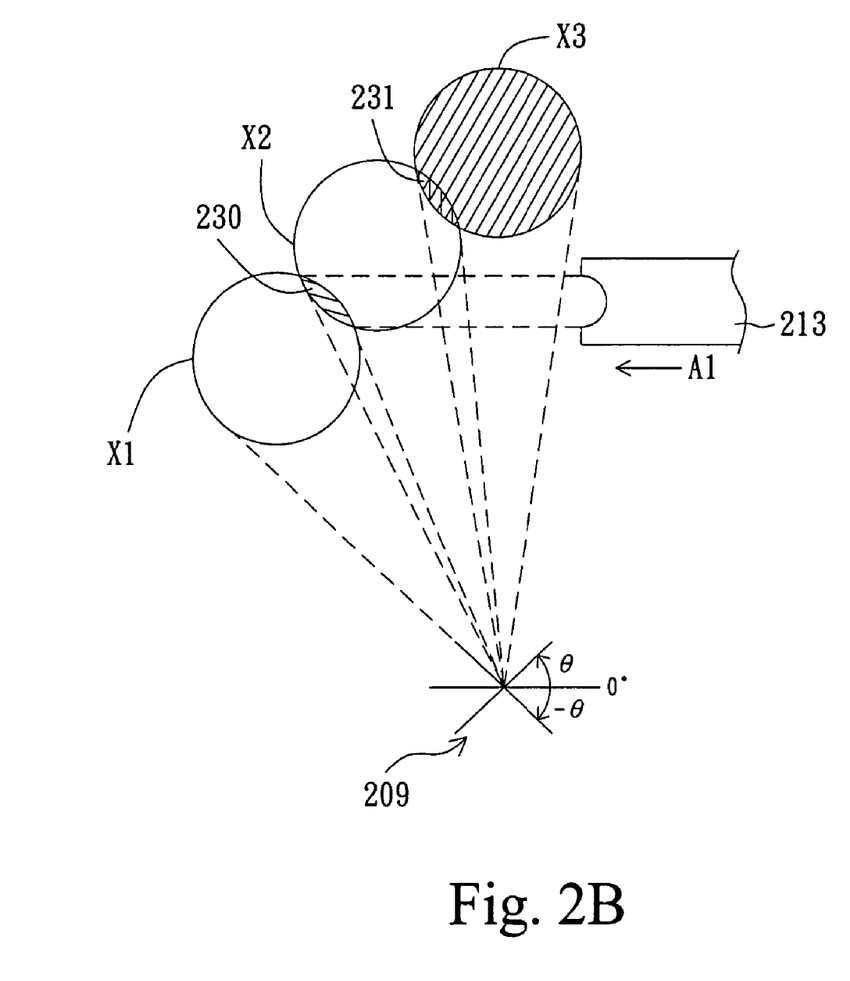
FIG. 2B is a schematic diagram showing a digital mirror device (DMD) performs an on-state, a flat-state and an off-state.

Please refer to FIGS. 2A and 2B, the illumination unit 204 comprises a controller (not shown) for controlling the DMD 209 to rotate at a specific angle (the preferred angle θ is between +12°~−12°) according to required digital input signals, in order to project the light beams transmitted from the light source 203 as an on-state X1 light, a flat state X2 light or an off-state X3 light. Actually, the DMD 209 comprises a plurality of micromirror unit corresponding in number to pixels. When the light 208a changes its direction by the DMD 209 to become a light 208b and be incident to the lens assembly 211, the light is located within the on-state X1 region. If the corresponding pixel is not desired to project on the screen, a specific micromirror unit of the DMD 209 is controlled by a controller (not shown) to rotate at a specific angle, to change the direction of the light 214a and become a light 214c which is not incident to the lens assembly 211. At this time, the light is located within the off-state X3 region. When a rotation angle of a part of the micromirror units of the DMD 209 is zero, the light is located within the flat state X2 region. Actually, the flat state X2 region overlaps with the on-state X1 region and the off-state X3 region respectively, to form overlap regions 230 and 231. The overlap region 231 formed by the flat state X2 region and the off-state X3 region does not need to project onto the lens assembly 211, therefore, it does not interfere with the display quality of images. For the overlap region 230, because the flat light having noise is incident to the lens assembly 211, the noise would interfere with the contrast of light located within the on-state X1 region. It means that the on-state X1 light and a part of the flat state X2 light are guided into the lens assembly 211 through the light inlet 216. Therefore, the entire contrast of the light passing through the on-state X1 region of the lens assembly 211 would be influenced.

If the area of the overlap region 230 is larger, the reduction of the contrast is more. On the contrary, if the area of the overlap region 230 is smaller, the reduction of the contrast is less. The invention utilizes this relationship to shield the overlap region 230 by using a regulation device 213, in order to make up the reduction of the above contrast and to improve the contrast as desired according to the size of the overlap region 230. If users feel that the contrast of projected image of the projector apparatus 200 is lower, the regulation device 213 can be adjusted to shift along direction A1, to make the regulation device 213 partially or completely shield the overlap region 230 in order to enhance the image contrast and control reduction of the brightness.

Figure 5A:
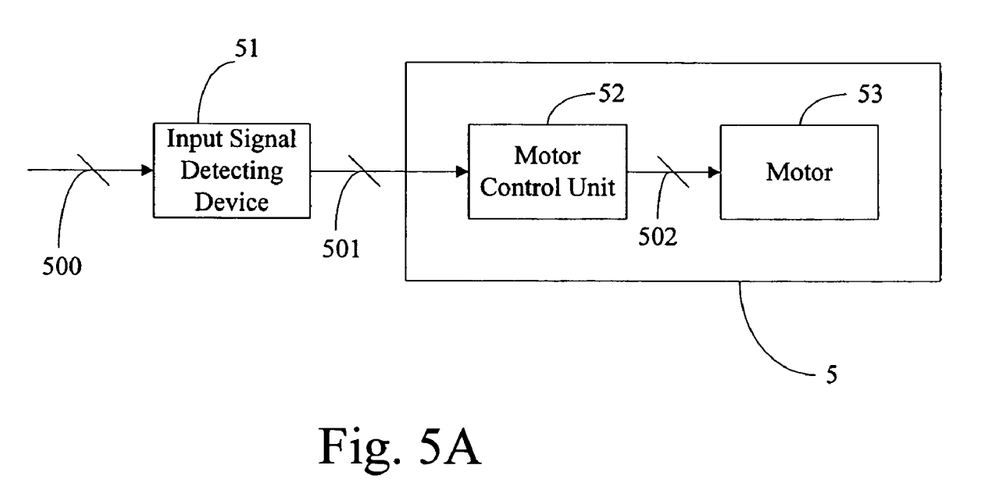
FIG. 5A is a schematic diagram showing the connection of the signals between the motor control unit and the input signal detecting device in the electrical regulation device of this invention.

As shown in FIG. 5A, the above regulation device 213 could be driven by a motor control system 5. The motor control system 5 comprises a motor control unit 52 and a motor 53, in which the motor control unit 52 could be a microcontroller of Model PIC 12C508 of MicroChip Technology Inc., The motor 53 could be a stepping motor of Model SA08S20N-001 that is produced by Delta Electronics Inc. The motor control system 5 is connected to a input signal detecting device 51 of the projector apparatus 200, in which the input signal detecting device 51 could be a chip of Model DDP2000 of Texas Instruments Inc. The input signal detecting device 51 connects the motor control unit 52 with a signal input of the projector apparatus 200. The projector apparatus 200 detects different types of input signals to decide the desired degree that the overlap region 230 is shielded by the regulation device 213. It should be understood that the motor control unit 52 and the input signal detecting device 51 are not limited to above exemplified models, any of others that can perform similar functions are suitable substitutes to match the needs.

For example, when the projector apparatus 200 receives a personal computer (PC)-like signal which often needs higher brightness but requires lower standards in connection with contrast, the projector apparatus 200 transmits a signal 501 to the motor control system 5, and the motor control system 5 operates the motor 53 to drive the regulation device 213 in an opposite direction of A1 by transmitting a motor control signal 502. The regulation device 213 is therefore driven to shield a smaller area of the overlap region 230. When the projector apparatus 200 receives a video-like signal, such as the signal coming out from home video system, which usually needs higher contrast and lower standards in connection with brightness, the projector apparatus 200 transmits a signal 501 to the motor control system 5, and the motor control system 5 operates the motor 53 to drive the regulation device 213 in the direction of A1 by transmitting a motor control signal 501. The regulation device 213 is then driven to shield a larger or the whole area of the overlap region 230.

Figure 5B:
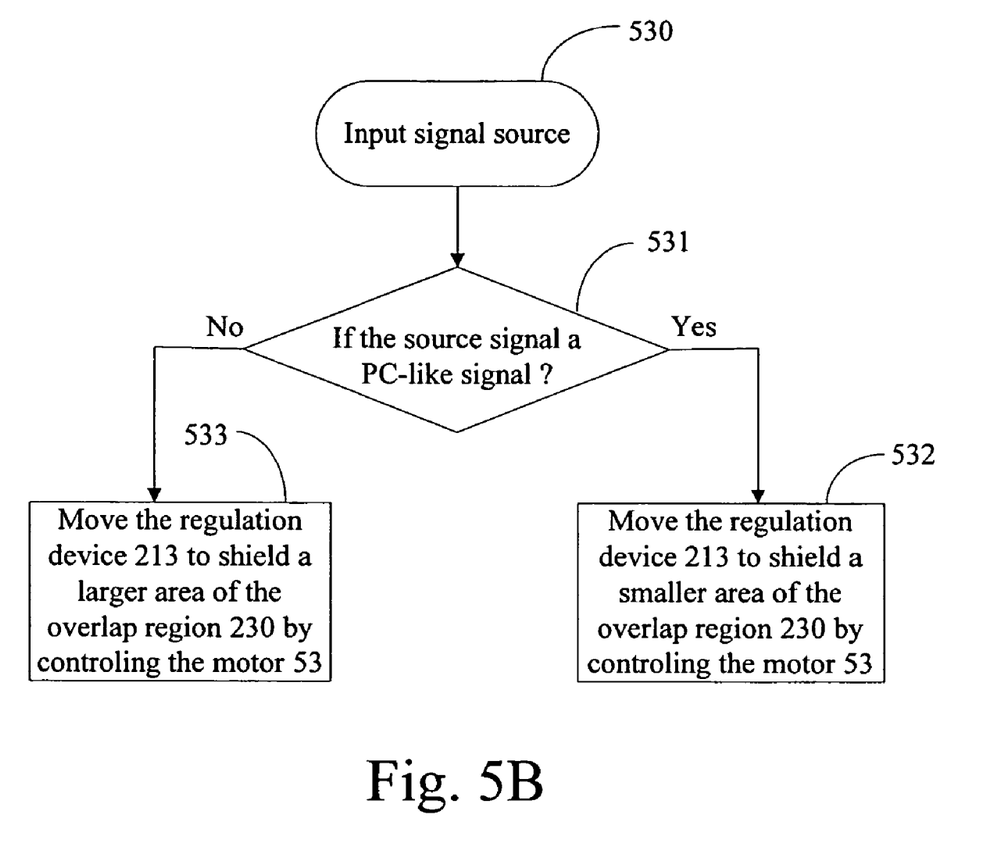
FIG. 5B is a schematic flow chart of FIG. 5A.

The logic of the control on the regulation device 213 of the above motor control system is illustrated as in the flow chart of FIG. 5B. When the projector apparatus receives an input signal source (designated as 530), the input signal detecting device determines whether the source signal is the PC-like signal (designated as 531). If affirmative, the regulation device is driven to shield a smaller area of the overlap region (designated as 532) by the motor, thereby obtaining the higher brightness of image. If the source signal is not the PC-like signal, then the regulation device is driven to shield a larger or the whole area of the overlap region (designated as 533) by the motor, thereby obtaining the higher contrast of image.

Figure 3A:
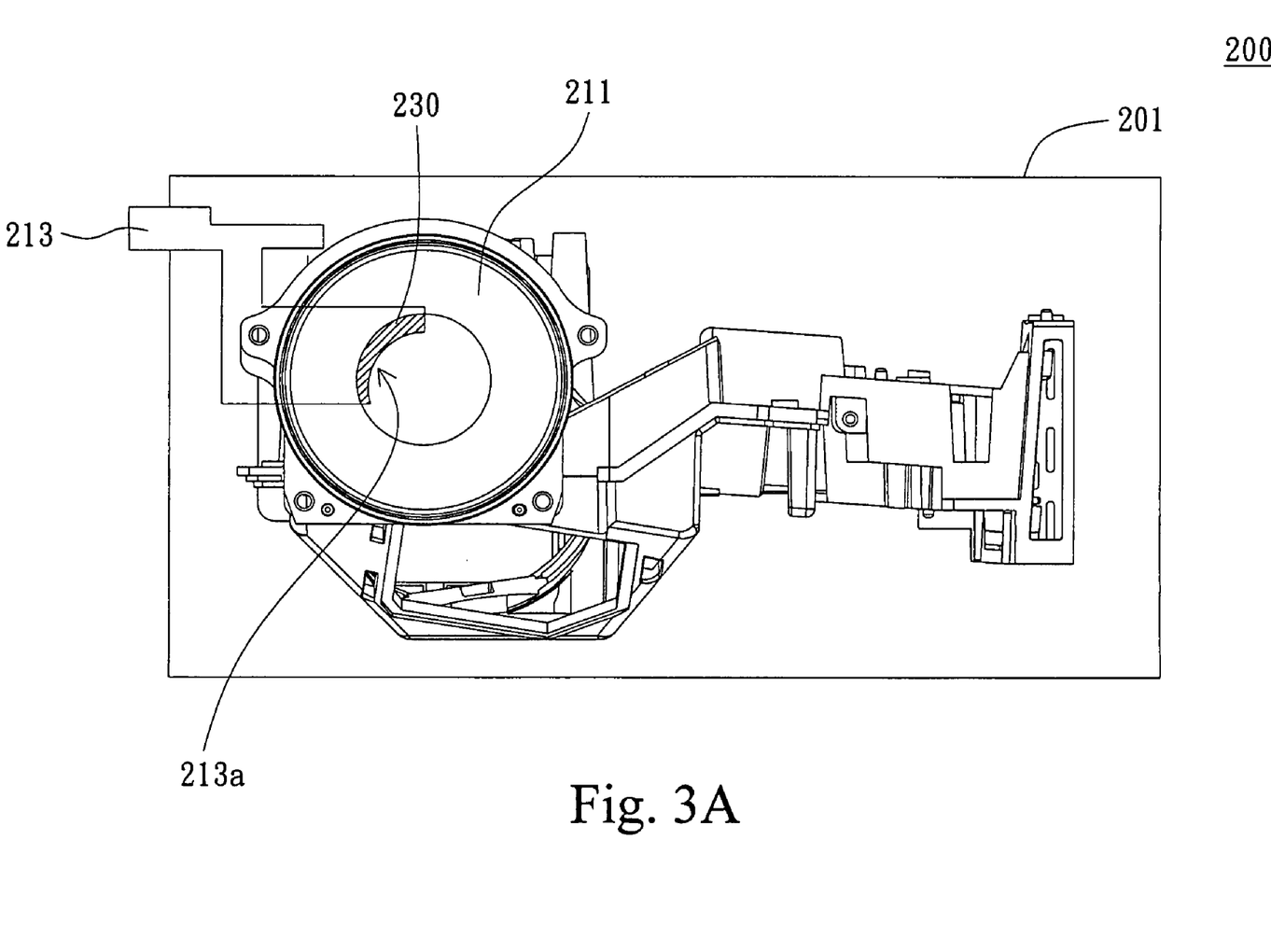
FIG. 3A is a front view showing the relationship of the regulation device and the projector apparatus shown in FIG. 2A.
Figure 3B:
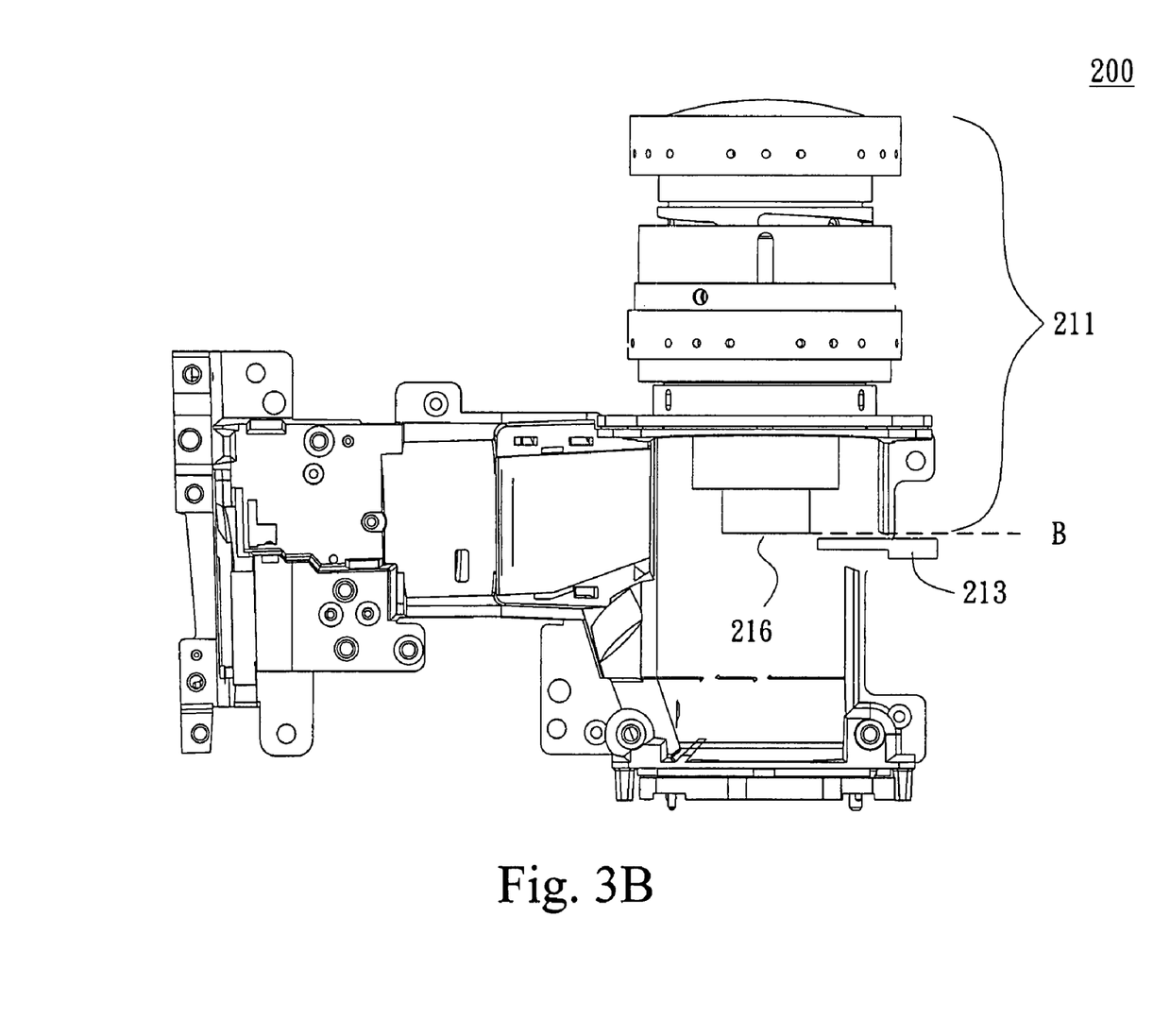
FIG. 3B is a vertical view showing the relationship of the regulation device and the projector apparatus shown in FIG. 2A.

Therefore, the invention is further characterized in that the projector apparatus 200 further comprises a regulation device 213 that is manipulated by users or controlled by the motor control system, according to the type of the source signal 500 provided at an outer side of the lens assembly 211, to shield at least a part of the flat state X2 light which is incident to the light inlet 216 in an adjustable or step toward electrically-controlled or mechanically-controlled manner. In details, an optical simulated exit pupil B is formed near the light inlet 216 of the lens assembly 211. A part of the flat state X2 light substantially overlaps with a part of an edge of the on-state X1 light, to form an overlap region 230, whereby the overlap region 230 is located within the exit pupil. Please refer to FIG. 3A, the type of the regulation device 213 is a baffle and a concave contour end 213a is suitable for matching the overlap region 230 formed by the on-state X1 light and the flat state X2 light. The pure on-state X1 light is not shielded, and therefore drastic reduction of the brightness can be avoided.

Figure 4:
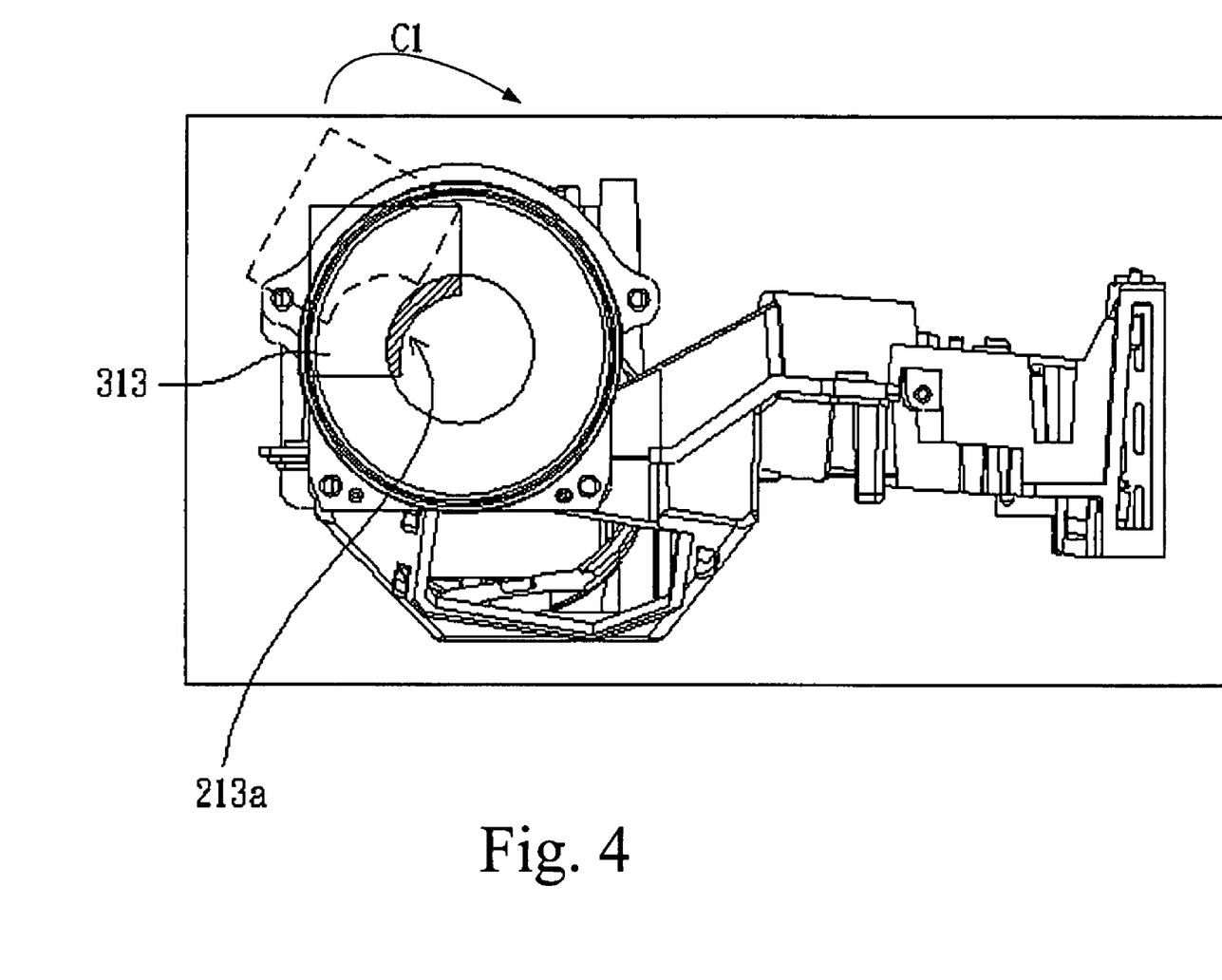
FIG. 4 is a front view showing the relationship of rotation of the regulation device and the projector apparatus shown in FIG. 2A.

The brightness is in conflict with the contrast substantially. When the regulation device 213 shifts along direction A1, the contrast is increased. However, a part of light is also shielded such that the brightness of the entire image is reduced. But if the regulation device 213 moves into the lens assembly 211 to make the light shielded region be limited within the overlap region 230 formed by the on-state X1 region and the flat state X2 region, therefore, the contrast is increased with limited reduction of the brightness. The movement of the regulation device 213 shielding at least a part of the flat state X2 light which is incident to the light inlet 216 can be designed as that shown in FIGS. 2B or 3A. In addition, the regulation device 313 shown in FIG. 4 rotates into the exit pupil B, to shield at least a part of the overlap region 230 and further increase the contrast.

The regulation device 213 is completely or partially arranged in the body 201 according the regulation method (electrically or mechanically, manual or mechanical calibration).

The contrast adjustable projector apparatus having a nontelecentric architecture of the present invention utilizes a regulation device provided at the exit pupil, to block light of noise-type due to the flat state light from being incident to the lens assembly. Therefore, the contrast is enhanced and the reduction of the brightness is under control. The user may adjust the brightness or the contrast according to his/her preference or habit. The regulation device is additionally arranged in the projector apparatus, and therefore the fabrication process of the lens assembly remains the same to achieve identical or better purpose. The cost of fabrication or assembly can be drastically reduced and the projector apparatus of the present invention is more competitive on the market.

It will be apparent to those skilled in the art that various modifications and variations may be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A contrast adjustable projector apparatus, comprising:
    a body;
    a light source, disposed in the body for generating light beams;
    a lens assembly, having a light inlet and an optical simulated exit pupil adjacent to the light inlet;
    an illumination unit, disposed in the body and connecting the light source and the lens assembly, in order to guide the light beams emitted from the light source to project onto the lens assembly, the illumination unit comprising:
    a controller;
    a digital micromirror device (DMD), controlled by the controller to rotate at a specific angle according to transmitted signals, in order to project the light beams transmitted from the light source as an on-state light, a flat state light or an off-state light, wherein the on-state light and a part of the flat state light are guided into the lens assembly through the light inlet;
    wherein the projector apparatus further comprises a regulation device provided at an outer side of the lens assembly, to adjustably shield at least a part of the flat state light which is incident to the light inlet and substantially overlaps with a part of an edge of the on-state light, to form an overlap region, whereby the overlap region is located within the exit pupil.

2. The contrast adjustable projector apparatus according to claim 1, wherein the illumination unit further comprises:
    a color wheel for receiving the light beams generated from the light source and transforming the light beams into lights of different colors;
    an integrator rod uniforming the lights transformed by the color wheel; and
    a reflector reflecting the uniformed lights of the integrator rod onto the digital micromirror device.

3. The contrast adjustable projector apparatus according to claim 2, wherein the projector apparatus is a projector having a nontelecentric architecture.

4. The contract adjustable projector apparatus according to claim 3, wherein the regulation device has a concave contour end suitable for matching the overlap region formed by the on-state light and the flat state light.

5. The contrast adjustable projector apparatus according to claim 3, wherein the regulation device is pivotally adjustable to shield at least a part of the overlap region.

6. The contrast adjustable projector apparatus according to claim 5, wherein the regulation device completely shields the overlap region.

7. The contrast adjustable projector apparatus according to claim 6, wherein the regulation device is a mechanically-controlled regulation device.

8. The contrast adjustable projector apparatus according to claim 6, wherein the regulation device is an electrically-controlled regulation device.

9. The contrast adjustable projector apparatus according to claim 5, wherein the regulation device is a mechanically-controlled regulation device.

10. The contrast adjustable projector apparatus according to claim 5, wherein the regulation device is an electrically-controlled regulation device.

11. The contrast adjustable projector apparatus according to claim 3, wherein the regulation device is movably adjustable to shield at least a part of the overlap region.

12. The contrast adjustable projector apparatus according to claim 11, wherein the regulation device is a mechanically-controlled regulation device.

13. The contrast adjustable projector apparatus according to claim 12, wherein the regulation device is a mechanically-controlled regulation device.

14. The contrast adjustable projector apparatus according to claim 12, wherein the regulation device is an electrically-controlled regulation device.

15. The contrast adjustable projector apparatus according to claim 11, wherein the regulation device is a mechanically-controlled regulation device.

16. The contrast adjustable projector apparatus according to claim 15, further comprises a signal input, a signal input detecting device, and a motor control device, wherein the signal input detecting device is connecting between the motor control device and the signal input.

17. The contrast adjustable projector apparatus according to claim 11, wherein the regulation device is an electrically-controlled regulation device.

18. The contrast adjustable projector apparatus according to claim 1, wherein the regulation device is a battle.

19. The contrast adjustable projector apparatus according to claim 1, wherein the regulation device is adapted to step toward to shield at least a part of the flat state light.

* * * * *